(12) United States Patent
Awane et al.

(10) Patent No.: US 12,542,415 B2
(45) Date of Patent: Feb. 3, 2026

(54) SEMICONDUCTOR LASER DEVICE

(71) Applicant: HORIBA, LTD., Kyoto (JP)

(72) Inventors: Yusuke Awane, Kyoto (JP); Makoto Matsuhama, Kyoto (JP); Kosuke Tsukatani, Kyoto (JP); Kodai Niina, Kyoto (JP); Takuya Ido, Kyoto (JP)

(73) Assignee: HORIBA, LTD. (JP)

( * ) Notice: Subject to any disclaimer, the term of this patent is extended or adjusted under 35 U.S.C. 154(b) by 189 days.

(21) Appl. No.: 18/280,195

(22) PCT Filed: Feb. 21, 2022

(86) PCT No.: PCT/JP2022/006960
§ 371 (c)(1),
(2) Date: Sep. 1, 2023

(87) PCT Pub. No.: WO2022/185970
PCT Pub. Date: Sep. 9, 2022

(65) Prior Publication Data
US 2024/0146020 A1    May 2, 2024

(30) Foreign Application Priority Data
Mar. 5, 2021  (JP) ................. 2021-035268

(51) Int. Cl.
*G01N 21/31* (2006.01)
*G01N 33/00* (2006.01)
(Continued)

(52) U.S. Cl.
CPC ............. *H01S 5/028* (2013.01); *G01N 21/31* (2013.01); *G01N 33/0027* (2013.01); *H01S 5/022* (2013.01); *G01N 2201/06113* (2013.01)

(58) Field of Classification Search
CPC .. G01N 21/031; G01N 21/31; G01N 21/3504; G01N 2201/06113;
(Continued)

(56) References Cited

U.S. PATENT DOCUMENTS

| 6,520,652 B1 | 2/2003 | Huang et al. |
| 2003/0202750 A1 | 10/2003 | Okada et al. |

(Continued)

FOREIGN PATENT DOCUMENTS

| JP | 04-360593 A | 12/1992 |
| JP | 2005-019746 A | 1/2005 |

(Continued)

OTHER PUBLICATIONS

EESR dated Jan. 13, 2025 issued in EP patent application No. 22763026.6.

(Continued)

*Primary Examiner* — Hina F Ayub
(74) *Attorney, Agent, or Firm* — Brooks Kushman P.C.

(57) ABSTRACT

To suppress individual differences in intensity of output laser light for each semiconductor laser device as much as possible while suppressing generation of stray light in a package of the semiconductor laser device, provided is a semiconductor laser device used for optical analysis, including: a package that accommodates a semiconductor laser element therein; and a light reflection reducing member that is provided inside the package and suppresses reflection of light emitted from the semiconductor laser element, in which the light reflection reducing member is bonded to an inner surface of the package.

8 Claims, 7 Drawing Sheets

(51) Int. Cl.
*H01S 5/022* (2021.01)
*H01S 5/028* (2006.01)

(58) Field of Classification Search
CPC ............ G01N 33/0027; H01S 2301/02; H01S 5/0064; H01S 5/022; H01S 5/02216; H01S 5/02218; H01S 5/02415; H01S 5/028; H01S 5/06804
See application file for complete search history.

(56) References Cited

U.S. PATENT DOCUMENTS

| | | | |
|---|---|---|---|
| 2004/0190576 A1* | 9/2004 | Matsuoka | ............... H01S 5/028 372/43.01 |
| 2009/0129427 A1 | 5/2009 | Ariga et al. | |
| 2010/0091804 A1 | 4/2010 | Musio et al. | |
| 2012/0177075 A1 | 7/2012 | Koeth | |
| 2018/0261714 A1 | 9/2018 | Taniguchi et al. | |
| 2019/0356108 A1 | 11/2019 | Matsuhama | |
| 2019/0363510 A1* | 11/2019 | Ariga | .................. H01S 5/06817 |

FOREIGN PATENT DOCUMENTS

| | | |
|---|---|---|
| JP | 2008-153639 A | 7/2008 |
| JP | 2015-148810 A | 8/2015 |
| JP | 2019-192915 A | 10/2019 |
| JP | 2019-201189 A | 11/2019 |
| WO | WO2017/073538 A1 | 5/2017 |

OTHER PUBLICATIONS

International Search Report dated Apr. 12, 2022 issued for International application No. PCT/JP2022/006960.

* cited by examiner

SEMICONDUCTOR LASER DEVICE

CROSS-REFERENCE TO RELATED APPLICATIONS

This application is the U.S. national phase of PCT Application No. PCT/JP2022/006960, filed Feb. 21, 2022, which claims priority to Japanese Patent Application No. 2021-035268, filed Mar. 5, 2021, the disclosures of which are incorporated in their entirety by reference herein.

TECHNICAL FIELD

The present invention relates to a semiconductor laser device.

BACKGROUND ART

In a semiconductor laser device, unnecessary light emitted from a rear end surface of a semiconductor laser element may be reflected inside a package to become stray light, and may exit to the outside of the package together with light emitted from a light emission surface of the semiconductor laser element and used for analysis or the like.

In such a case, since interference occurs between the light emitted from the light emission surface and the stray light, there is a problem that the intensity of laser light output from the package to the outside fluctuates when the interference between these two types of light changes.

As a technique for preventing light emitted from a rear end surface of a semiconductor laser element from being reflected inside a package and becoming stray light, as described in Patent Literature 1, a technique for applying a black resin to an inner surface of the package is disclosed.

CITATION LIST

Patent Literature

Patent Literature 1: JP 4-360593 A

SUMMARY OF INVENTION

Technical Problem

However, as described in Patent Literature 1, in the method for applying the black resin to the inner surface of the package, it is difficult to uniformly apply the resin, and the thickness of the applied resin tends to be uneven. When the thickness of the resin becomes uneven, the amount of light absorbed by the resin varies, so that the degree of generation of stray light varies for each semiconductor laser device. When the thickness of the resin varies, the application amount of the resin also varies. When the application amount of the resin changes, the total amount of the resin arranged in the package changes, so that the heat capacity affecting the temperature in the package and the degassing amount generated from the resin change.

Since the intensity and oscillation wavelength of the laser light output from the package to the outside fluctuate depending on the temperature and the like in the package, the present inventor has found that there is a problem that individual differences in the intensity and oscillation wavelength of the laser light output from the semiconductor laser device increases for each semiconductor laser device when the application amount of the resin varies as described above.

The present invention has been made in view of such a problem, and an object of the present invention is to suppress individual differences in intensity and oscillation wavelength of output laser light for each semiconductor laser device as much as possible while suppressing generation of stray light in a package of the semiconductor laser device.

Solution to Problem

That is, a semiconductor laser device according to the present invention is a semiconductor laser device used for optical analysis, including: a package that accommodates a semiconductor laser element therein; and a light reflection reducing member that is provided inside the package and suppresses reflection of light emitted from the semiconductor laser element, in which the light reflection reducing member is bonded to an inner surface of the package.

According to such a semiconductor laser device, since the formed light reflection reducing member is bonded to the inner surface of the package, it is easy to control the thickness of the light reflection reducing member. As a result, it is possible to suppress the variation in the thickness or amount of the light reflection reducing member arranged in the package in each semiconductor laser device 100 can be suppressed, and individual differences in the intensity and oscillation wavelength of the output laser light for each semiconductor laser device to a degree that does not cause a problem even in applications requiring high analysis accuracy.

When the semiconductor laser element includes a light emission surface that emits light and a rear end surface that is an end surface opposite to the light emission surface, and the light reflection reducing member is arranged so as to cover a range, on an inner surface of the package, irradiated with light emitted from the rear end surface of the semiconductor laser element, it is possible to efficiently suppress the light emitted from the rear end surface of the semiconductor laser element from being reflected in the package and becoming stray light.

It is preferable that the package includes a box body whose upper side is open and a lid body that seals the opening, and that the light reflection reducing member is bonded to an inner surface of the lid body and/or an inner surface of the box body facing the rear end surface.

If the surface of the light reflection reducing member facing the rear end surface is arranged obliquely with respect to the light emission surface, even when light is slightly reflected by the light reflection reducing member, it is possible to suppress the reflected light from exiting to the outside together with the light emitted from the light emission surface.

Specific examples of the light reflection reducing member include a black film-like member in which the light reflection reducing member contains light absorbing substances and a binder that binds the light absorbing substances to each other.

As a specific embodiment for suppressing individual differences in the intensity of the output laser light for each semiconductor laser device as small as possible by making the amount of light absorbed by the resin, the influence on the temperature, and the like due to the presence of the light reflection reducing member in the package uniform as much as possible, a film in which a difference between a maximum thickness and a minimum thickness of the film is 10% or less of an average thickness of the film can be mentioned.

Advantageous Effects of Invention

According to the present invention, since the light reflection reducing member is bonded to the inner surface of the package, the thickness of the light reflection reducing member can be easily controlled. As a result, it is possible to suppress a change in the thickness of the light reflection reducing member arranged in the package, and thus, it is possible to suppress individual differences in the intensity of the output laser light for each semiconductor laser device to a degree that does not cause a problem even in applications requiring high analysis accuracy.

Figure 1:
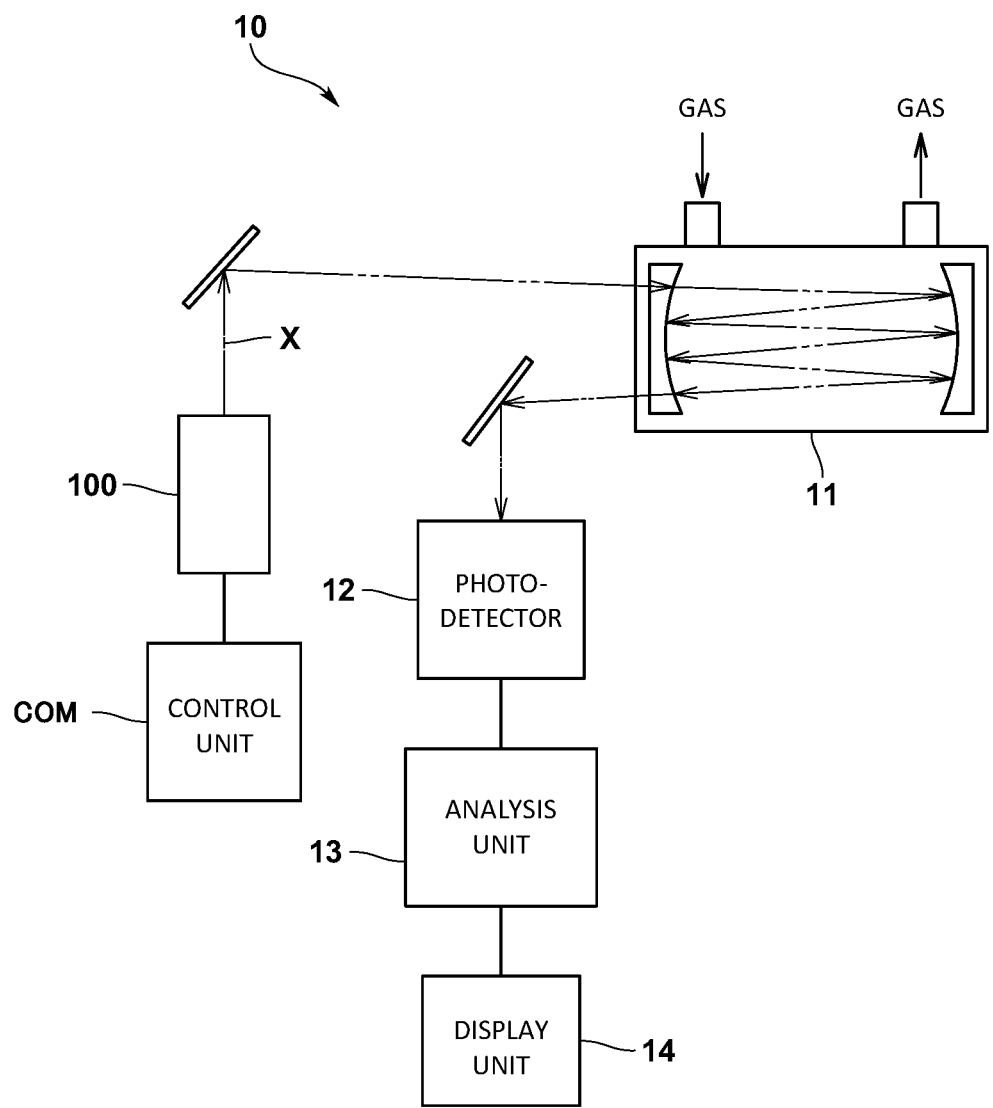
FIG. 1 is an overall schematic view of a gas analyzer in which a semiconductor laser device according to an embodiment of the present invention is used.

REFERENCE SIGNS LIST 100 semiconductor laser device
2 semiconductor laser element
21 light emission surface
22 rear end surface
6 package
7 light reflection reducing member
10 gas analyzer
11 measurement cell
12 photodetector
13 analysis unit

DESCRIPTION OF EMBODIMENTS

Hereinafter, an embodiment of a semiconductor laser device according to the present invention will be described with reference to the drawings.

<Basic Configuration of Semiconductor Laser Device According to Present Embodiment>

As shown in FIG. 1, a semiconductor laser device 100 according to the present embodiment is used for a gas analyzer 10 that analyzes, for example, a component to be measured (for example, nitrides such as CO, $CO_2$, $H_2O$, NO, $NO_2$, $N_2O$, and $NH_3$, hydrocarbon components such as $CH_4$ and $C_2H_6$, and hydrocarbon components including oxygen such as HCHO) in a gas by optical analysis. Here, a gas analyzer 10 includes a multiple reflection type measurement cell 11 into which a gas is introduced, the semiconductor laser device 100 that irradiates the measurement cell 11 with laser light X, a photodetector 12 that detects the laser light X having passed through the measurement cell 11, an analysis unit 13 that analyzes a component to be measured using a detection signal obtained by the photodetector 12, and a display unit 14 that displays a result analyzed by the analysis unit 13. Note that the measurement cell 11 is not limited to the multiple reflection type, and may be a single reflection type or a 1-pass type that does not use reflection. This gas analyzer can analyze various gases, and can also be used, for example, when analyzing an exhaust gas discharged from an internal combustion engine, a gas flue, or the like.

Figure 2:
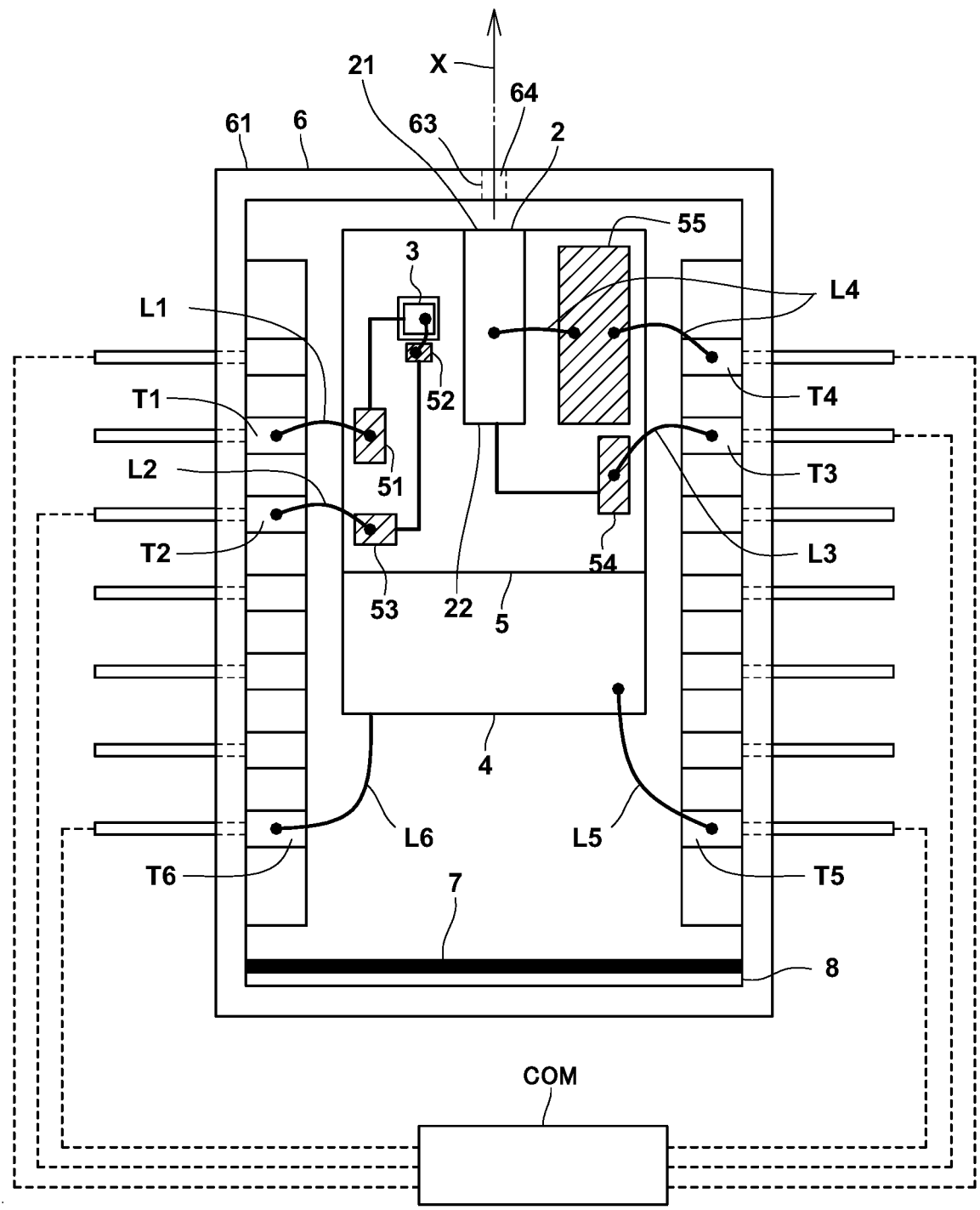
FIG. 2 is a plan view schematically showing an overall configuration of the semiconductor laser device according to the present embodiment.
Figure 3:
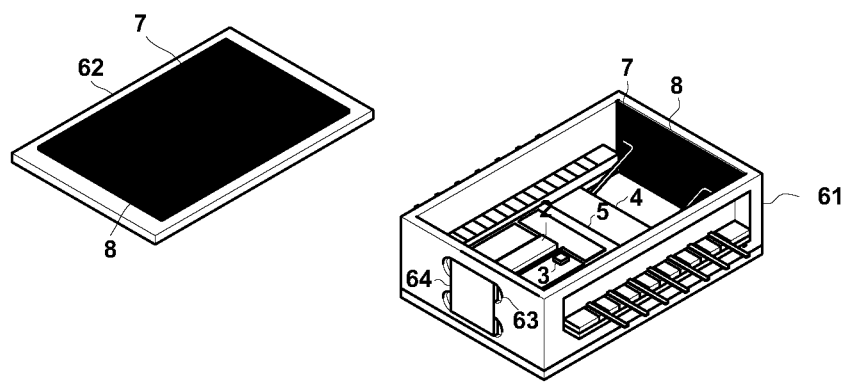
FIG. 3 is a perspective view schematically showing an overall configuration of the semiconductor laser device according to the present embodiment in a state where a lid body is removed (wiring is omitted).
Figure 4:
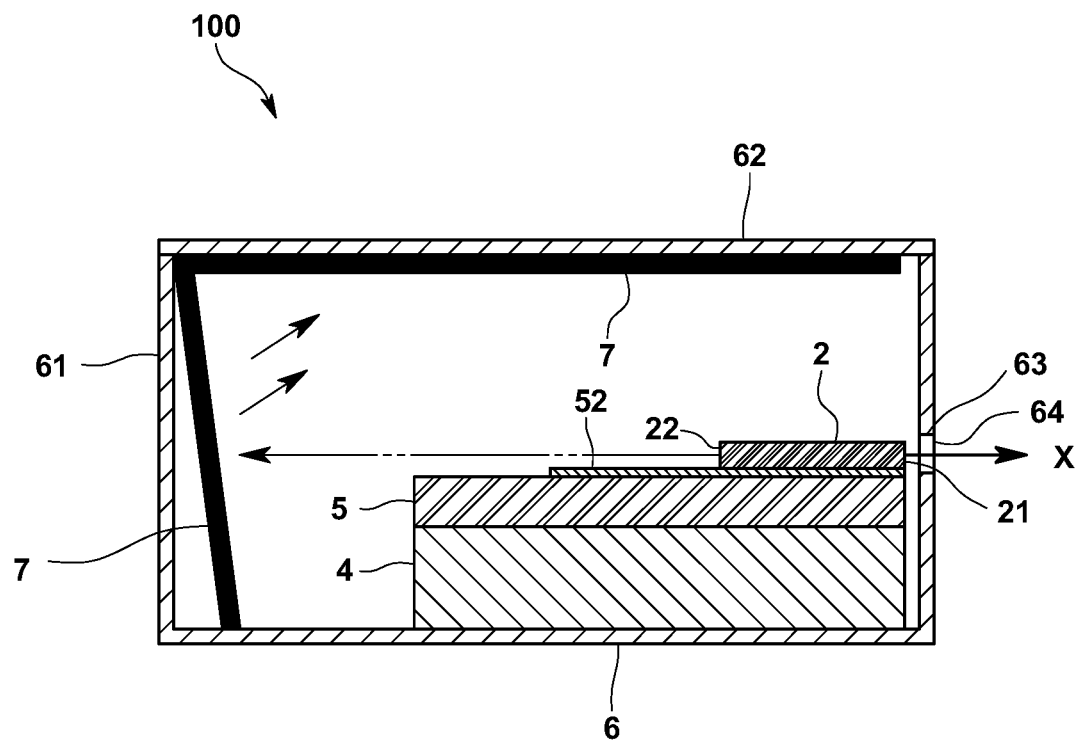
FIG. 4 is a sectional view schematically showing an overall configuration of the semiconductor laser device according to the present embodiment.

Specifically, the semiconductor laser device 100 emits laser light X having an oscillation wavelength including an absorption wavelength of a component to be measured, and includes, as shown in FIGS. 2 to 4, a semiconductor laser element 2, a temperature detection element 3 that detects a temperature of the semiconductor laser element 2, a cooling mechanism 4 on which the semiconductor laser element 2 and the temperature detection element 3 are mounted and which cools the semiconductor laser element 2, a submount 5 provided between the semiconductor laser element 2 and the temperature detection element 3, and the cooling mechanism 4, and a package 6 that accommodates these.

The semiconductor laser element 2 is, for example, a distributed feedback laser (DFB laser) that emits laser light X having an infrared wavelength, and in particular, in the present embodiment, the semiconductor laser element 2 is a quantum cascade laser in which a plurality of well layers is connected in multiple stages and which emits light by optical transition between subbands formed in the quantum wells. The semiconductor laser element 2 has, for example, a rectangular parallelepiped shape, and includes a light emission surface 21 that emits light and a rear end surface 22 that is an end surface opposite to the light emission surface 21.

The temperature detection element 3 detects the temperature of the semiconductor laser element 2 by detecting the temperature of the submount 5 on which the semiconductor laser element 2 is mounted. The temperature detection element 3 of the present embodiment is a thermistor, and is provided in the vicinity of the semiconductor laser element 2 in order to reduce the difference from the temperature of the semiconductor laser element 2. The temperature detection element 3 in FIG. 2 is provided on the side of the semiconductor laser element 2, but may be provided at other positions.

The cooling mechanism 4 is configured using a Peltier element, and an upper surface thereof is a heat absorbing surface. The submount 5 is provided in contact with the heat absorbing surface. The cooling mechanism 4 is controlled by a control unit COM that has acquired the detection temperature of the temperature detection element 3. Specifically, the control unit COM controls the power applied to the Peltier element using the detection temperature of the temperature detection element 3 so that the detection temperature of the temperature detection element 3 becomes a desired temperature.

The submount 5 is, for example, a ceramic substrate such as aluminum nitride (AlN) or silicon carbide (SiC). The semiconductor laser element 2 and the temperature detection element 3 are provided on the upper surface of the submount 5. Metal layers 51, 52, 53, 54, and 55 electrically connected to the elements 2 and 3 are formed on the upper surface of the submount 5.

The package 6 includes a bottom plate that accommodates the semiconductor laser element 2 and the like therein, and a side wall provided around the bottom plate. In the present embodiment, a butterfly package is adopted as an example of the package 6, and the package 6 in this case includes, for example, a box body 61 whose upper surface is opened and a lid body 62 that seals the opening.

The box body 61 includes, for example, a quadrangular bottom plate and four side walls standing upright from the bottom plate, and forms a rectangular parallelepiped space in which the semiconductor laser element 2 and the like are accommodated.

The lid body 62 has, for example, a plate shape for sealing an opening formed in the box body 61.

A light lead-out portion 63 for leading out the laser light X to the outside is formed on a side wall of the package 6 facing the light emission surface 21 of the semiconductor laser element 2. The light lead-out portion 63 is provided with an optical window member 64, and the optical window member 64 is slightly inclined (for example, by 2 degrees) so that the laser light X reflected by the optical window member 64 does not return to the semiconductor laser element 2 again. Here, as an example of the package, a case where a rectangular parallelepiped is adopted has been described, but the present invention is not limited thereto, and for example, packages having various shapes such as a cylindrical CAN type package can be used. In the present embodiment, the light emission surface 21 of the semiconductor laser element 2 faces the side wall of the box body 61, but the light emission surface 21 may be arranged to face the lid body or the bottom plate.

The package 6 is provided with output terminals T1 and T2 for outputting the output of the temperature detection element 3 to the outside, and power supply terminals T3 and T4 for supplying power to the semiconductor laser element 2. The output terminals T1 and T2 and the power supply terminals T3 and T4 are arbitrarily determined depending on which of the temperature detection element 3 and the semiconductor laser element 2 is connected. The package 6 is also provided with power supply terminals T5 and T6 for supplying power to the Peltier element of the cooling mechanism 4.

Wirings L1 and L2 for temperature detection electrically connected to the temperature detection element 3 are connected to the output terminals T1 and T2. There are two output terminals T1 and T2, and the wiring L1 connected to the metal layer 51 electrically connected to one electrode of the temperature detection element 3 is connected to one output terminal T1, and the wiring L2 electrically connected to the other electrode of the temperature detection element 3 is connected to the other output terminal T2. These wirings L1 and L2 are, for example, gold wires.

Wirings L3 and L4 for the semiconductor laser element 2 electrically connected to the semiconductor laser element 2 are connected to the power supply terminals T3 and T4 of the semiconductor laser element 2. There are two power supply terminals T3 and T4, and the wiring L3 connected to the metal layer 54 electrically connected to one electrode of the semiconductor laser element 2 is connected to one power supply terminal T3, and the wiring L4 electrically connected to the other electrode of the semiconductor laser element 2 via the metal layer 55 is connected to the other power supply terminal T4. Similarly, wirings L5 and L6 for the Peltier element electrically connected to the Peltier element are connected to the power supply terminals T5 and T6 of the Peltier element.

<Characteristic Configuration of Semiconductor Laser Device According to Present Embodiment>

Thus, the semiconductor laser device 100 according to the present embodiment includes a light reflection reducing member 7 that absorbs light and suppresses reflection of light inside the package 6. The light reflection reducing member 7 is bonded to the inner surface of the package 6.

The light reflection reducing member 7 absorbs light to reduce light reflection, and is, for example, a flat black film-like member.

The light reflection reducing member 7 contains, for example, light absorbing substances and a binder for binding the light absorbing substances to each other. Examples of the light absorbing substance include carbon black.

Examples of the binder include a photosensitive material composed of a silicone resin, polyimide, or cyclized rubber. The light absorbing substance is not limited to an organic substance such as carbon black, and may contain an inorganic substance.

The thickness of the light reflection reducing member 7 is preferably 0.5 µm or more from the viewpoint of sufficiently reducing the light reflection, and is preferably 5 µm or less from the viewpoint of suppressing the manufacturing cost of the light reflection reducing member 7. In the semiconductor laser device 100 according to the present embodiment, the thickness of the light reflection reducing member 7 is more preferably 1 µm or more and 4 µm or less. The thickness of the light reflection reducing member 7 is not limited to the above-described range, and can be appropriately changed according to the application of the semiconductor laser device 100, the intensity of light emitted from the rear end surface 22 of the semiconductor laser element 2, and the like.

The thickness of the light reflection reducing member 7 is preferably as uniform as possible, and specifically, the difference between the largest thickness and the smallest thickness of one light reflection reducing member 7 is preferably 20% or less of the average thickness of the light reflection reducing member 7, and more preferably 10% or less.

For example, as shown in FIG. 2, the light reflection reducing member 7 is in a liquid or gel state when applied, and is bonded to the inner surface of the package 6 using an adhesive that forms the solid adhesive layer 8 by curing.

The adhesive can be appropriately changed depending on the material forming the light reflection reducing member 7 and the package 6, but in the case of the present embodiment, for example, a fluorine-based adhesive containing fluorine or a silicon-based adhesive containing silicon is preferably used.

In the present embodiment, the light reflection reducing member 7 is provided only in a range irradiated with light emitted from the rear end surface 22 of the semiconductor laser element 2 on the inner surface of the package 6. The range irradiated with the light emitted from the rear end surface 22 of the semiconductor laser element 2 includes a range directly irradiated with the light emitted from the rear end surface 22 of the semiconductor laser element 2 and a range irradiated after the light emitted from the rear end surface 22 of the semiconductor laser element 2 is reflected.

As described above, the package 6 in the present embodiment includes the box body 61 accommodating the semiconductor laser element 2 and the like therein, and the lid body 62 capable of sealing the opening formed in the box body 61. The light reflection reducing member 7 is bonded to a surface forming an internal space (sealed space) of the package 6 out of surfaces of the box body 61 and the lid body 62. In the case of the present embodiment, the light emitted from the rear end surface 22 of the semiconductor laser element 2 is applied to the inner surface facing the rear end surface 22 among the inner surfaces of the box body 61 constituting the package 6, and thus the light reflection reducing member 7 is bonded to the inner surface.

The light reflection reducing member 7 absorbs the light emitted from the rear end surface 22 of the semiconductor laser element 2 to prevent the light from the rear end surface 22 from being reflected in the package and becoming stray light. However, it is also conceivable that a part of the light emitted to the light reflection reducing member 7 is slightly reflected. Therefore, in the light reflection reducing member 7, for example, a surface facing the rear end surface of the light reflection reducing member 7 provided on an inner surface facing the rear end surface 22 of the semiconductor laser element 2 is preferably arranged obliquely with respect to the light emission surface 21. In the present embodiment, the flat film-like light reflection reducing member 7 is arranged to be inclined with respect to the light emission surface 21 of the semiconductor laser element 2. With such a configuration, it is possible to suppress the light slightly reflected by the light reflection reducing member 7 among the light emitted from the rear end surface 22 of the semiconductor laser element 2 from returning to the semiconductor laser element 2. It is possible to further suppress the light from being reflected toward the light lead-out portion 63 and led out from the light lead-out portion 63 to the outside.

When the light reflected from the light reflection reducing member 7 is applied to the semiconductor laser element 2, other sensors, and the like arranged in the package 6, there is a possibility of affecting the operation of the semiconductor laser element 2 and other sensors.

Therefore, when the light reflection reducing member 7 is arranged to be inclined, for example, the light reflection reducing member 7 is preferably arranged at an angle at which the reflected light is directed to another inner surface of the container constituting the package 6, the inner surface of the lid body 62, or the like.

In the case of the present embodiment, as shown in FIG. 4, the light reflection reducing member 7 arranged to face the rear end surface of the semiconductor laser element 2 is arranged to be inclined such that the light reflected by the light reflection reducing member 7 is directed toward the inner surface of the lid body 62. In this case, in order to further reduce the reflection of the light reflected by the light reflection reducing member 7, it is preferable to arrange the light reflection reducing member 7 also on the portion irradiated with the reflected light reflected by the light reflection reducing member 7 (the other inner surface or the inner surface of the lid body 62). In the case of the present embodiment, the light reflection reducing member 7 is also arranged on the inner surface of the lid body 62 so as to receive the light reflected by the light reflection reducing member 7 arranged to face the rear end surface 22 of the semiconductor laser element 2. It is preferable that these light reflection reducing members 7 be formed separately and be bonded to the inner surface of the box body 61 and the inner surface of the lid body 62, respectively.

<Method for Manufacturing Semiconductor Laser Device According to Present Embodiment>

The semiconductor laser device 100 according to the present embodiment can be manufactured, for example, by the following method and procedure.

(Method for Manufacturing Light Reflection Reducing Member)

The light reflection reducing member 7 can be formed, for example, by applying a resin material mixed with carbon black on a silicon wafer by spin coating and drying the resin material.

In addition, manufactured is possible by, for example, pressing a mixture of carbon black as a light absorbing substance and a resin containing silicon dioxide as a binder to form a film, and punching the film into a necessary shape using, for example, a cutter or the like.

(How to Attach Light Reflection Reducing Member to Inner Surface of Package)

Manufactured is possible by bonding the light reflection reducing members 7 to portions of the inner surfaces of the box body 61 and the lid body 62 irradiated with light emitted from the rear end surface of the semiconductor laser element 2 with an adhesive or the like.

More specifically, an adhesive is applied to the inner surface of the box body 61 and the inner surface of the lid body 62 constituting the package, and the light reflection reducing members 7 manufactured as described above are attached thereto to dry the adhesive.

When the light reflection reducing member 7 is arranged to be slightly inclined as described above, the thickness of the adhesive layer 8 formed in a planar shape between the inner surface of the package and the light reflection reducing member 7 may be adjusted, a spacer may be arranged between the light reflection reducing member 7 and the bonding surface in order to incline the light reflection reducing member 7, or the inner surface itself of the package covered by the light reflection reducing member 7 may be slightly inclined. As shown in FIG. 4, the light reflection reducing member 7 can be fixed by bonding the end of the light reflection reducing member 7 and the inner surface of the package in a state where the light reflection reducing member 7 is arranged to be inclined.

The thickness of the adhesive layer 8 applied at this time can be appropriately changed depending on the material, thickness, and the like of the light reflection reducing member 7 to be bonded, but for example, the thickness after application and drying is preferably 1 µm or more and 100 µm or less. In the case of the present embodiment, the thickness after applying and drying is preferably 10 µm or more and 50 µm or less, and particularly preferably 30 µm or more and 40 µm or less.

After the light reflection reducing member 7 is bonded in this manner, a peeling test or the like is performed to confirm that the light reflection reducing member 7 is not immediately peeled off, and then the cooling mechanism, the mount, the semiconductor laser element 2, the temperature detection element, and the like are arranged in the box body 61. Thereafter, the lid body 62 is arranged so as to close the opening of the box body 61 and sealed.

Effects of Present Embodiment

According to the semiconductor laser device 100 configured as described above, since the light reflection reducing member 7 formed in advance is bonded to the inner surface of the package 6, the thickness of the light reflection reducing member 7 can be more easily controlled as compared with the case where the material for forming the light reflection reducing member 7 is directly applied.

As a result, the mass of the light reflection reducing member 7 arranged in the package 6 for each semiconductor laser device 100 can be made as uniform as possible, and the variation in the output value of the laser light for each semiconductor laser device 100 can be suppressed as small as possible.

Since the light reflection reducing member 7 is arranged so as to cover only the range irradiated with the light emitted from the rear end surface of the semiconductor laser element 2, the range to which the light reflection reducing member 7 is bonded can be further reduced. As a result, the manufacturing cost of the semiconductor laser device 100 can be reduced as compared with a case where a film is attached to the entire inner surface.

In the present embodiment, the light reflection reducing member 7 arranged to face the rear end surface of the semiconductor laser element 2 is arranged to be inclined such that the light reflected by the light reflection reducing member 7 is directed toward the inner surface of the lid body 62, and the light reflection reducing member 7 is also arranged on the inner surface of the lid body 62 so as to be able to receive the light reflected by the light reflection reducing member 7. Therefore, even when light is slightly reflected by the light reflection reducing member 7 arranged to face the rear end surface of the semiconductor laser element 2, light can be received again by the light reflection reducing member 7 arranged on the inner surface of the lid body 62, so that stray light can be suppressed as small as possible.

When a liquid or gel adhesive is used as the adhesive, the adhesive may be deformed when cured, and random irregularities may be generated on the surface. In such a case, if a sufficiently thin film-like light reflection reducing member 7 is used, it is conceivable that the surface shape of the light reflection reducing member 7 also randomly changes so as to follow the surface shape of the adhesive layer 8. As a result, even when light is slightly reflected by the surface of the light reflection reducing member 7, the light is dispersed in a random direction, so that the light reflected toward the light lead-out portion 63 can be reduced as much as possible.

Experimental Example

Hereinafter, a result of checking whether stray light is reduced by actually using the semiconductor laser device 100 according to the present embodiment will be disclosed.

In the present experimental example, as a conventional example, a semiconductor laser device having exactly the same configuration as the semiconductor laser device 100 according to the present embodiment except that the light reflection reducing member is not arranged in the package is used for comparison.

Figure 5:
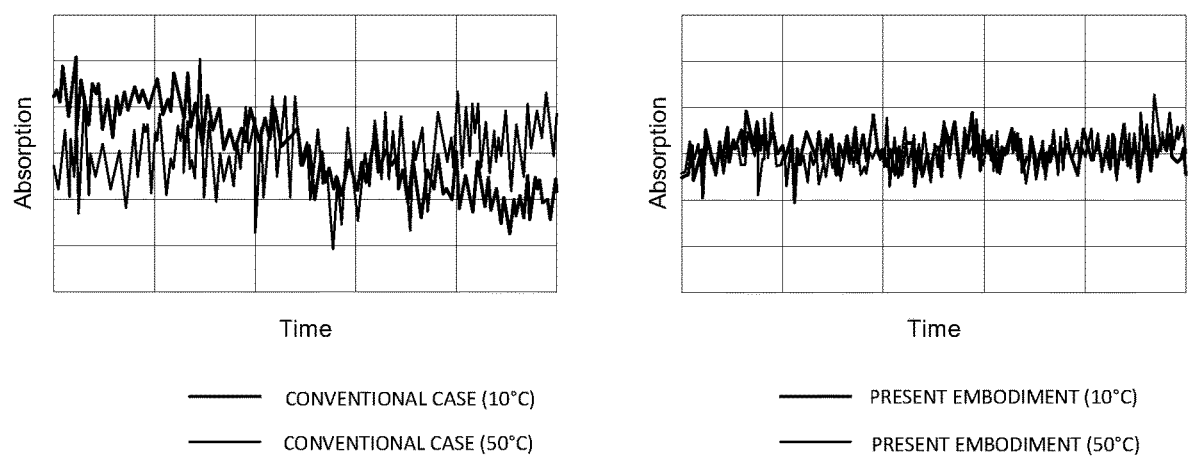
FIG. 5 is a graph showing a spectrum of the semiconductor laser device according to the present embodiment.

FIG. 5 is a comparison of output values of laser light when the temperature is changed for these semiconductor laser devices.

As can be seen from the results of FIG. 5, in the semiconductor laser device 100 according to the present embodiment in which the light reflection reducing member is arranged in the package, noise in the output value of the laser light is clearly reduced as compared with the semiconductor laser device in which the light reflection reducing member is not arranged, and further, a change in the output value of the laser light due to a temperature change is reduced. This is considered to be an effect due to reduction of stray light in the package by arranging the light reflection reducing member in the package.

In a case where the hydrocarbon concentration or the like is actually measured using the semiconductor laser device in which the light reflection reducing member is not arranged, the concentration indication value fluctuates greatly up and down with the temperature change. However, in a case where the hydrocarbon concentration or the like is similarly measured using the semiconductor laser device 100 according to the present embodiment, it has been confirmed that the fluctuation of the concentration indication value due to the temperature is clearly suppressed to be small.

Furthermore, according to the semiconductor laser device 100 according to the present embodiment, it is found that the fluctuation of the concentration indication value due to the temperature change of 10 degrees is within ±1%, and this fluctuation value sufficiently satisfies the standard of the analyzer used when the hydrocarbon concentration in the exhaust gas is measured.

<Modification>

The present invention is not limited to the above embodiment.

Figure 6:
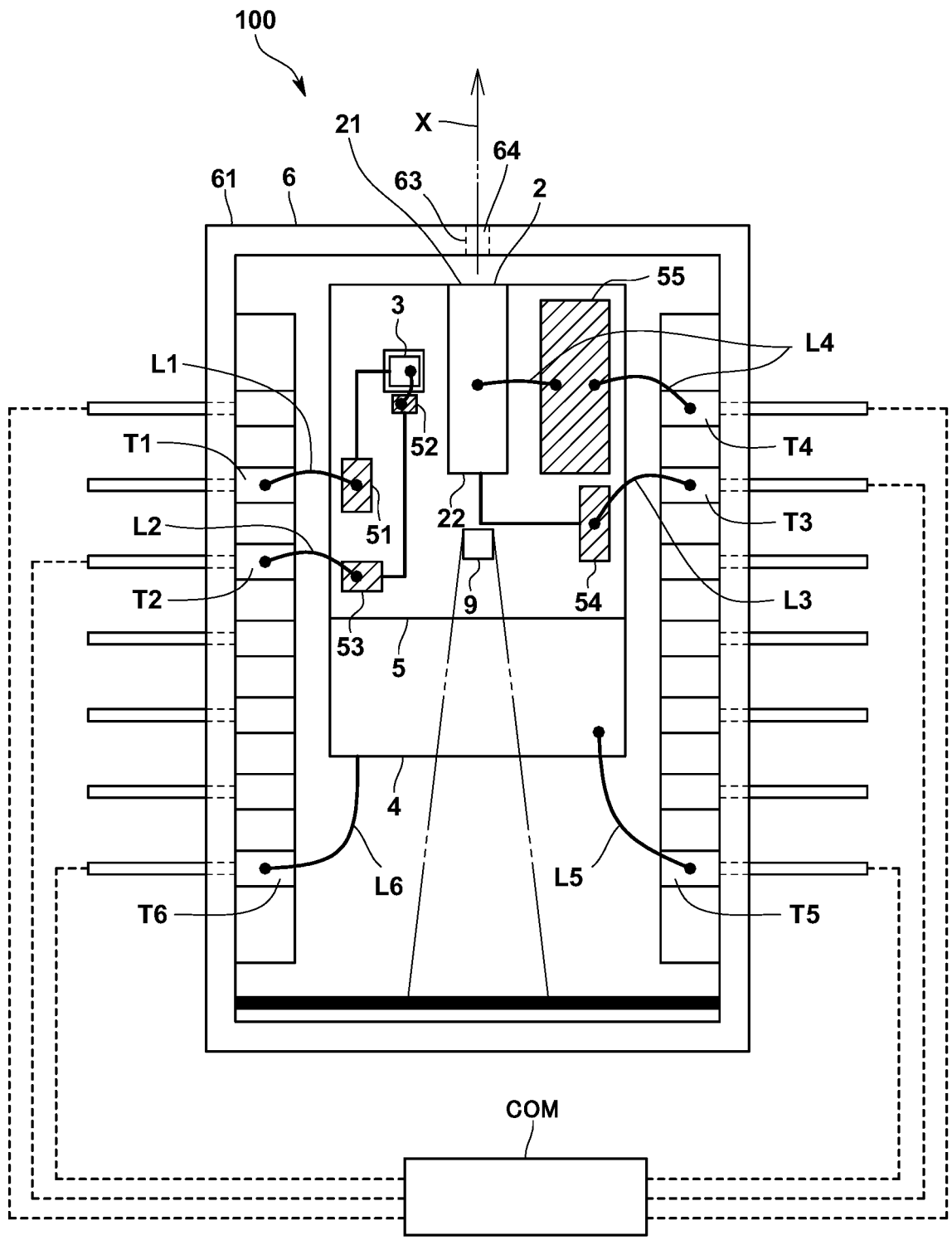
FIG. 6 is a plan view schematically showing an overall configuration of a semiconductor laser device according to another embodiment of the present invention.

For example, as shown in FIG. 6, at least a part of a member (such as an optical sensor) other than the semiconductor laser element arranged inside may be arranged between the rear end surface of the semiconductor laser element 2 and the inner surface of the package.

Figure 7:
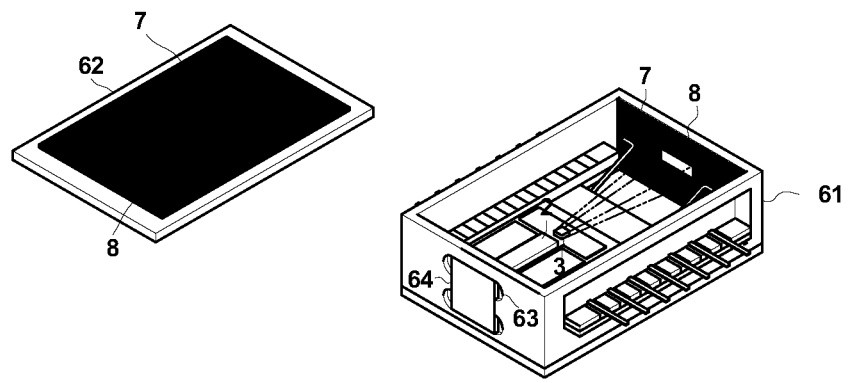
FIG. 7 is a perspective view schematically showing an overall configuration of the semiconductor laser device according to the another embodiment of the present invention in a state where a lid body is removed (wiring is omitted).

In this case, these sensors and the like function as a light shielding member 9, and a portion that is not irradiated with light from the rear end surface of the semiconductor laser element is formed on the inner surface of the package. Therefore, for example, as shown in FIG. 7, even if the light reflection reducing member is arranged on the inner surface of the package while avoiding the range in which the light is shielded by the light shielding member 9, the generation of stray light can be sufficiently suppressed.

In addition, by providing a range in which the light reflection reducing member is not bonded, a space for arranging solder, wiring, or the like may be secured on the surface facing the rear end surface of the semiconductor laser element or the inner surface of the lid body. As a result, the degree of freedom in designing wiring and the like can be improved. By changing the arrangement place and shape of the light shielding member 9, the shape and area of the portion where the light reflection reducing member is not arranged can be appropriately changed as necessary.

The light reflection reducing member may be bonded only to the inner surface of the box body, or may be bonded to the inner surface of the box body and the inner surface of the lid body. When the light reflection reducing member is bonded to two or more portions of the inner surface of the package, one formed as one light reflection reducing member covering two or more portions may be used due to ease of manufacturing and bonding, or a plurality of separately molded light reflection reducing members may be used in combination.

The package has a space for accommodating the semiconductor laser element therein, and may include a light lead-out portion for leading out light from the semiconductor laser element at one end thereof, and is not limited to the package having the shape described above. The package is not limited to the box body and the lid body.

Although it has been described that the light reflection reducing member is, for example, a black member containing a light absorbing substance such as carbon black, the light reflection reducing member does not need to be black, and may be any member having a property capable of reducing light reflection.

Although it has been described that the light reflection reducing member is a film, the light reflection reducing member may have a plate shape having a thickness larger than that of the film.

The light reflection reducing member does not necessarily have to be flat, and for example, may have irregularities formed on its surface.

As the adhesive for bonding the light reflection reducing member to the inner surface of the package, an example in which the liquid or gel adhesive is applied to the inner surface of the package has been described. Alternatively, an adhesive molded in a plate shape or a film shape in advance may be used.

The adhesive may be any material as long as the light reflection reducing member can be fixed to the inner surface of the package, and can be appropriately changed depending on the light reflection reducing member and the material forming the inner surface of the package.

The method for bonding the light reflection reducing member to the inner surface of the package is not limited to the method using the adhesive, and may be, for example, brazing or welding (for example, soldering).

INDUSTRIAL APPLICABILITY

According to the present invention, it is possible to suppress individual differences in the intensity and oscillation wavelength of output laser light for each light among semiconductor laser device as much as possible while suppressing the generation of stray light in the package of the semiconductor laser device.

The invention claimed is:

1. A semiconductor laser device used for optical analysis, the device comprising:
   a package that accommodates a semiconductor laser element therein; and
   a light reflection reducing member that contains a light absorbing substance and a binder, that is provided inside and bonded to an inner surface of the package, and that suppresses reflection of light emitted from the semiconductor laser element.

2. The semiconductor laser device according to claim 1,
   wherein the semiconductor laser element includes a light emission surface that emits light and a rear end surface that is an end surface opposite to the light emission surface, and
   wherein the light reflection reducing member is arranged so as to cover a range, on the inner surface of the package, irradiated with light emitted from the rear end surface of the semiconductor laser element on the inner surface of the package.

3. The semiconductor laser device according to claim 2,
   wherein the package includes a box body whose upper side is open and a lid body that seals the opening, and
   wherein the light reflection reducing member is bonded to an inner surface of the lid body and/or an inner surface of the box body facing the rear end surface.

4. The semiconductor laser device according to claim 2, wherein a surface of the light reflection reducing member facing the rear end surface is arranged obliquely with respect to the light emission surface.

5. The semiconductor laser device according to claim 1, wherein the light reflection reducing member is a black film.

6. The semiconductor laser device according to claim 1, wherein the light reflection reducing member is a film, and a difference between a maximum thickness and a minimum thickness of the film is 10% or less of an average thickness of the film.

7. A gas analyzer comprising:
   a light source using the semiconductor laser device according to claim 1;
   a measurement cell into which a gas is introduced;
   a detector that detects laser light emitted from the light source and passing through the measurement cell; and
   an analysis unit that analyzes a component to be measured, using a detection signal obtained by the detector.

8. A method for manufacturing a semiconductor laser device used for optical analysis, and including a package that accommodates a semiconductor laser element therein and a light reflection reducing member provided inside the package, the method comprising:
   bonding the light reflection reducing member, that contains a light absorbing substance and a binder, to the inside of the package via the binder.

* * * * *